United States Patent [19]

Ichikawa

[11] Patent Number: 4,633,743

[45] Date of Patent: Jan. 6, 1987

[54] NOTCHER WITH IMPROVED WASTE CHIP REMOVAL MEANS

[75] Inventor: Koji Ichikawa, Kanagawa, Japan

[73] Assignee: Fuji Photo Film Co., Ltd., Kanagawa, Japan

[21] Appl. No.: 742,481

[22] Filed: Jun. 7, 1985

[30] Foreign Application Priority Data

Jun. 7, 1984 [JP] Japan .................................. 59-117590

[51] Int. Cl.⁴ ................................................ B26D 3/14
[52] U.S. Cl. ........................................... 83/100; 83/169;
83/171; 83/440.1; 83/522; 83/693; 83/916;
83/69
[58] Field of Search .............................. 83/22, 98–100,
83/440.1, 444, 449, 522, 693, 916, 698, 169, 171,
636, 575, 917, 69

[56] References Cited

U.S. PATENT DOCUMENTS

| 2,117,797 | 5/1938 | Flynn et al. | 83/100 X |
| 2,182,744 | 12/1939 | Ehrsam | 83/100 X |
| 2,707,028 | 4/1955 | Burton. | |
| 3,041,905 | 7/1962 | Gabriel | 83/100 |
| 3,962,980 | 6/1976 | Hedegaard et al. | 112/252 |

FOREIGN PATENT DOCUMENTS 258566 4/1970 U.S.S.R. .

Primary Examiner—James M. Meister
Attorney, Agent, or Firm—Sughrue, Mion, Zinn, Macpeak, and Seas

[57] ABSTRACT

A notcher includes a die having a die bore and a notching cutter received in the die bore. The die bore is connected to a suction device, and the notching cutter is formed with an air hole which opens to the atmospheric air and is communicated with the die bore. Accordingly, notching chips are smoothly discharged.

20 Claims, 8 Drawing Figures

NOTCHER WITH IMPROVED WASTE CHIP REMOVAL MEANS

BACKGROUND OF THE INVENTION

1. Field of the Invention:

The present invention relates to a notcher employed in forming a notch on, for example, a photographic film.

2. Description of the Prior Art:

To subject a negative film to printing by the use of a printer, it is general practice to form a notch with, for example, a semilunar shape, on a portion of one edge of the film so that it is possible for an image frame to be automatically positioned by detecting the notch. A notcher is generally employed as a means for forming such a notch on a film.

Conventional notchers include a force-cut type notcher such as that shown in FIG. 6 and a draw-cut type notcher such as that shown in FIG. 7. The force-cut type notcher shown in FIG. 6 is arranged such that a notching cutter 12 is pressed downwardly from the upper side of a die 10 such as to force-cut a portion of one edge of a negative film 14 positioned on the upper surface of the die 10, thereby forming a semilunar notch on the negative film 14. On the other hand, the draw-cut type notcher shown in FIG. 7 is arranged such that the notching cutter 12 is pulled downwardly from the lower side of the die 10, whereby a semilunar notch is similarly formed on the negative film 14.

These notchers, however, suffer from the following problem. Semilunar chips 16 produced as the result of the shearing effected for forming notches drop by virtue of gravity and are discharged from a discharge outlet 18. The behavior of the dropping chips 16 is, however, unstable so that they are not always smoothly discharged, which fact involves a risk of notching chips getting stuck in the operating section of the notcher, thus causing trouble.

To solve the above-described problem, a means has heretofore been adopted in which the discharge outlet 18 is connected to a hose which is in turn connected to a vacuum pump, and notching chips are thereby sucked and forcedly discharged.

However, even if such a forced discharge means is employed, the air flow path is undesirably closed by the notching cutter 12 in the state wherein the notching cutter 12 which has been moved downwardly is fitted in the die 10. In consequence, the above-described suction operation is interrupted, and notching chips are therefore sucked and discharged in an intermittent manner. Thus, the above-described problem remains unsolved.

SUMMARY OF THE INVENTION

In view of the above-described fact, it is a primary object of the present invention to provide a notcher which is capable of smoothly discharging notching chips.

To this end, the invention provides a notcher which comprises: a die having a die bore connected to a suction device; and a notching cutter formed with an air hole which is communicated with the die bore, whereby it is possible for notching chips to be smoothly discharged.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1A:
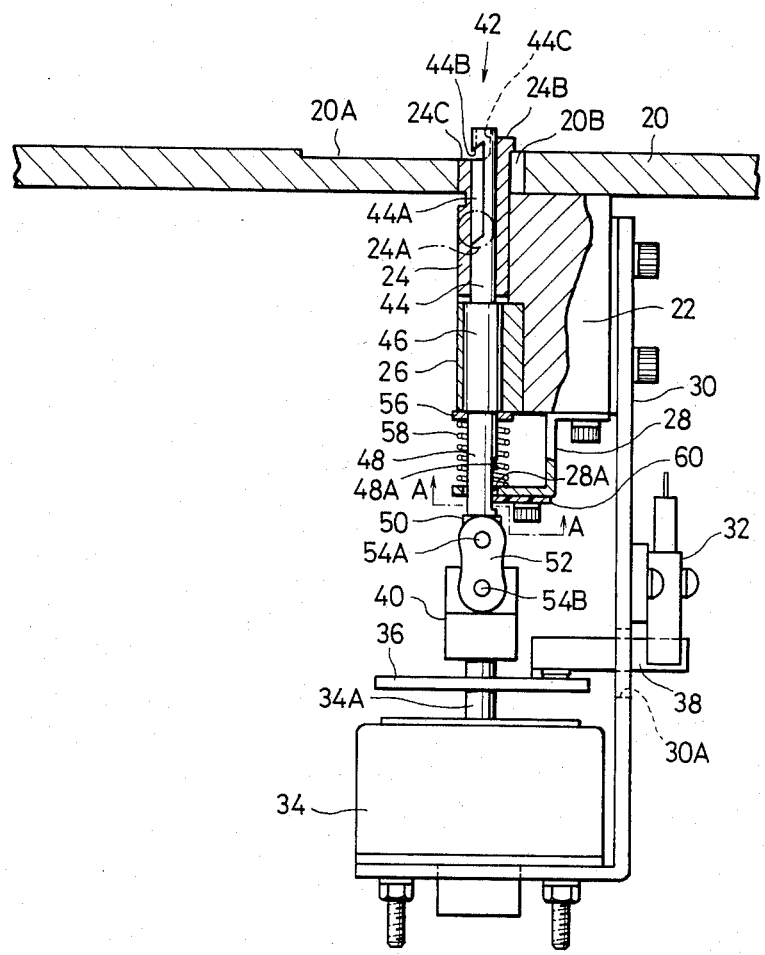
FIG. 1A is a fragmentary front elevational view of a first embodiment of the notcher according to the present invention.

FIGS. 1A, 1B, 2 and 3 in combination show a first embodiment of the notcher according to the present invention, the embodiment exemplifying a draw-cut type notcher.

A conveyor table 20 is formed with a guide groove 20A for guiding a negative film 14. The arrangement is such that it is possible for the negative film 14 to be fed at a predetermined pitch by a feed mechanism (not shown) while being guided by the guide groove 20A. The conveyor table 20 is further formed with a rectangular opening 20B in such a manner that the opening 20B overlaps the guide groove 20A.

A base 22 is secured to the reverse surface of the conveyor table 20 in such a manner as to extend downwardly therefrom. The base 22 has a die 24 secured to its upper part, the die 24 having an opening (referred to as a "die bore", hereinafter) with a circular cross-section. The die 24 further has an oilless metal 26 secured to its lower part, the oilless metal 26 having an opening with a circular cross-section. The respective centers of these openings are of the die 24 and the metal 26 located on the same imaginary line. In addition, the base 22 has a Z-shaped bracket 28 secured to its reverse surface in such a manner that the bracket 28 extends therefrom downwardly. The bracket 28 has an opening 28A with a circular cross-section formed in its horizontal portion on the side thereof which is closer to its free end. The center of the opening 28A is also located on the above-described imaginary line.

Figure 1B:
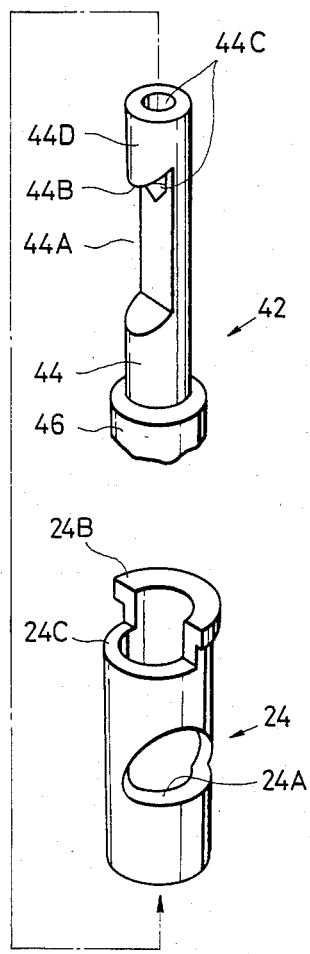
FIG. 1B is an enlarged perspective view of a portion of the first embodiment shown in FIG. 1A.
Figure 2:
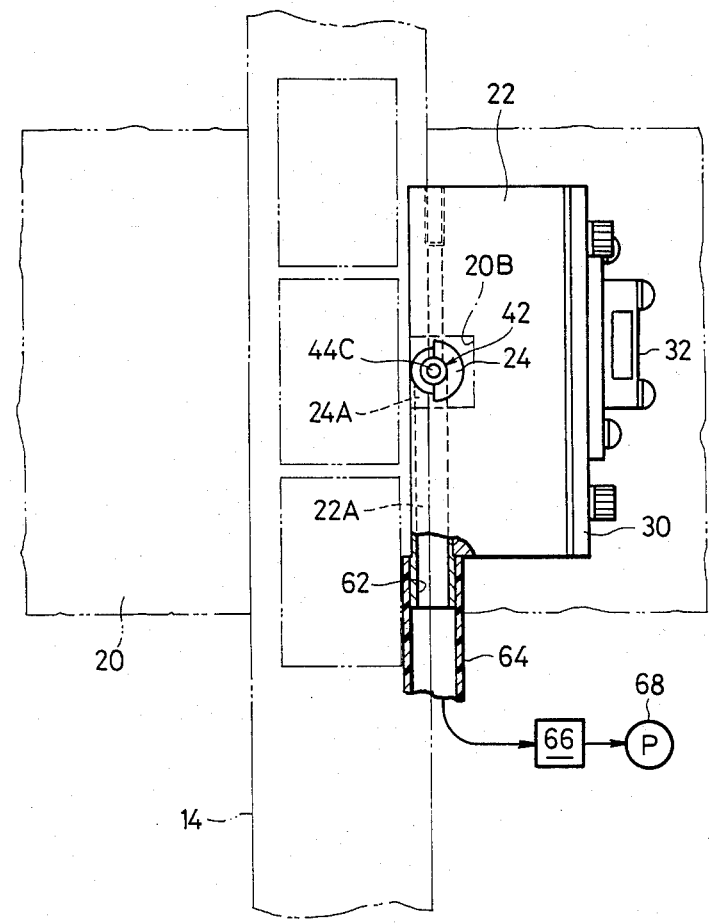
FIG. 2 is a plan view of the first embodiment.

The die 24 has its upper portion projecting from the upper surface of the base 22 in such a manner that the projecting upper portion is located within the opening 20B formed in the conveyor table 20. The upper end portion of the die 24 is formed into a stepped shape by cutting away a short length of the upper end portion through one half of its cross section as shown in FIG. 1B. A flange is formed at the end of the upper portion 24B which remains. The step portion 24C is located on the side of the die 24 which is closer to the guide groove 20A, and the surface of the step portion 24C is located such as to be flush with the surface of the guide groove 20A.

An L-shaped bracket 30 is secured to the base 22 in such a manner as to extend downwardly therefrom. The L-shaped bracket 30 has a sensor 32 secured to its vertical portion on the side thereof which is closer to its fixed end. A solenoid 34 is disposed on the horizontal portion of the L-shaped bracket 30 on the side thereof which is closer to its free end. The sensor 32 is a photoelectric sensor, the lower portion of its body having a forked configuration with twin prongs. A light projector is disposed on one of the prongs of the forked portion of the sensor body, and a light receiver on the other.

When excited, the solenoid 34 causes a rod 34A to move downwardly by a predetermined stroke. A guide plate 36 is secured to an intermediate portion of the rod 34A. The guide plate 36 has a light-intercepting plate 38 secured thereto, the plate 38 being constituted by a thin sheet-like member. The distal end of the light-intercepting plate 38 extends through an opening 30A which is formed in the L-shaped bracket 30 in such a manner that the distal end of the plate 38 is located on the imaginary center line which passes through the center of the space between the prongs of the lower portionl of the sensor 32. Further, a coupling member 40 is secured to the distal end of the rod 34A.

A notching cutter 42 is constituted by a round rod which is formed at its upper end with a notching edge portion 44 of reduced diameter, a slide portion 46, a guide portion 48 and an engagement portion 50 which are disposed in that order from the upper end thereof. The nothcing edge portion 44 has a cross-sectional configuration which enables the notching edge portion 44 to fit into the die bore of the die 24. The notching edge portion 44 is, as shown in FIG. 1B, formed on one side with a substantially semicylindrical cut portion 44A which extends along the central portion of the notching edge portion 44. The lower edge of the projecting portion 44D on the upper side of the cut portion 44A is formed into a notch cutting edge 44B. Further, the notching edge portion 44 is formed with an air hold 44C which opens onto the upper surface of the notching edge portion 44. The lower side of the air hole 44C opens onto the cut portion 44A. The slide poriton 46 has a cross-sectional configuration which enables a slide portion 46 to fit into the oillness metal 26, while the guide portion 48 has a cross-sectional configuration which permits the guide portion 48 to fit into the opening 28A formed in the Z-shaped bracket 28. Moreover, the guide portion 48 is partially cut such as to form a planar portion 48A.

Thus, the notching cutter 42 has: the notching edge portion 44 inserted into the oillness metal 26 from the lower side thereof and fitted into the die 24; the slide portion 46 fitted into the oillness metal 26; a guide portion 48 fitted into a Z-shaped bracket 28; and the engagement portion 50 connected to the coupling member 40 of the solenoid 34 through a connecting plate 52. The connecting plate 52 is pivotally connected to the engagement portion 50 and the coupling member 40 through respective pins 54A and 54B.

Figure 3:
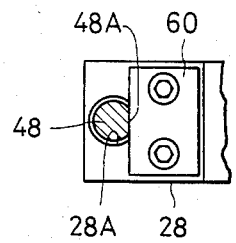
FIG. 3 is a sectional view of a portion of the first embodiment as in the direction of the arrows A—A in FIG. 1A.

It is to be noted that the Z-shaped bracket 28 is mounted while being fitted onto the notching cutter 42 from the side thereof which is closer to the engagement portion 50 after the notching cutter 42 is fitted into the die 24 and the oilless metal 26 and before the notching cutter 42 and the solenoid 34 are connected together. Prior to the mounting of the Z-shaped bracket 28, an annular spring seat 56 and a compression coil spring 58 are successively fitted on the notching cutter 42 from the side thereof which is closer to the engagement portion 50. Accordingly, in the state wherein the Z-shaped bracket 28 is secured to the base 22, the compression coil spring 58 is located between the spring seat 56 and the Z-shaped bracket 28. Moreover, the Z-shaped bracket 28 has a rectangular plastic plate 60 secured thereto in such a manner that the plastic plate 60 covers a portion of the circular opening 28A as shown in FIG. 3. The plastic plate 60 has one end thereof abutting against the planar portion 48A formed on the guide portion 48 of the notching cutter 42.

The die 24 has a bore 24A cut through one side which is communicated with the cut portion 44A formed on the notching edge portion 44 of the notching cutter 42 when it is fitted into the die bore. The bore 24A is communicated with a horizontal bore 22A which is formed in the base 22. The bore 22A is connected with a hose 64 through a nipple 62 which is screwed into the base 22. The other end of the hose 64 opens into a notching chip collecting box 66 which is communicated with a vacuum pump 68 serving as a suction device through a screen (not shown).

Figure 4:
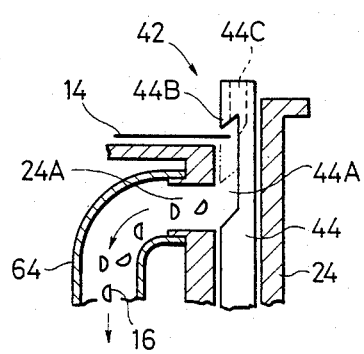
FIG. 4, an essential portion of the first embodiment shown in FIG. 1A.

The operation of this embodiment will now be described with reference to FIGS. 1A, 1B and 2 to 4. FIG. 4 shows an essential portion of the notcher in accordance with this embodiment. In FIG. 4, however, the bore 24A formed in the die 24 is moved 90° from its actual position and the hose 64 is directly connected to this bore 24A for the sake of convenience.

The negative film 14 which is to be formed with notches is conveyed by the feed mechanism (not shown) while being guided by the guide groove 20A on the conveyor table 20. When the negative film 14 is moved to a predetermined position (the position shown in FIG. 2), the solenoid 34 is excited, and the rod 34A is thereby moved downwardly by a predetermined stroke against the biasing force of the compression coil spring 58. This movement of the rod 34A causes the notching cutter 42 to also move downwardly through the connecting plate 52. The edge portion of the negative film 14 is located below the notch cutting edge 44B formed on the notching edge portion 44 of the notching cutter 42 as well as being above the die bore of the die 24. The edge portion of the negative film 14 is therefore sheared by the cooperation between the notch cutting edge 44B and the die 24, and a semilunar notch is thereby formed on the film 14.

On the other hand, the die bore of the die 24 is supplied with the outside air from the air hole 44C formed in the notching cutter 42 by means of the suction force produced by the vacuum pump 68, whereby air flow toward the notching chip collecting box 66 is formed in the die bore. Accordingly, the semilunar notching chip 16 which has been cut off from the negative film 14 by shearing is deposited into the notching chip collecting box 66 through the horizontal bore 24A formed in the die 24, the horizontal bore 22A formed in the base 22, and the hose 64.

After a notch has been formed in the negative film 14 in the manner described above, the excitation of the solenoid 34 is suspended, whereby the rod 34A of the solenoid 34 and the notching cutter 42 are returned to their previous positions by means of the biasing force of the compression coil spring 58. Then, the negative film 14 is fed by an amount which corresponds to the length of one image frame and at this position a notch is formed on the film 14 in the same manner as the above. Thereafter, the above-described notching operation is repeated, whereby notches are formed at the edge portions of all the image frames to be printed.

It is to be noted that, since the slide portion 46 of the notching cutter 42 is vertically slid while being supported and guided by the oilless metal 26, the notching edge portion 44 and the die 24 are accurately positioned with respect to each other in the diametrical plane. Further, the notching cutter 42 is prevented from rotating, since the planar portion 48A formed on the guide portion 48 slides while abutting against the plastic plate 60 secured to the Z-shaped bracket 28. Furthermore, since the notching cutter 42 and the rod 34A of the solenoid 34 are pivotally connected through the connecting plate 52, even if any slight error should occur in centering the notching cutter 42 and the rod 34A of the solenoid 34 with respect to each other, no problem will arise as they operate.

The sensor 32 counts the number of notches formed on the negative film 14 by detecting the beam emitted from the light projector to the light receiver. More specifically, when a notch is formed on the negative film 14, the rod 34A of the solenoid 34 is moved downwardly, and the light-intercepting plate 38 is correspondingly moved downwardly from the position shown in FIG. 1. In consequence, the beam from the the light projector which has until that point been intercepted now enters the light receiver, and the beam is then detected.

Thus, according to this embodiment in which the invention is applied to a draw-cut type notcher, the die is provided with the horizontal bore communicated with the die bore, and the horizontal bore is connected to the vacuum pump. Further, the notching cutter is formed with the air hole which is communicated with the die bore. The outside air is therefore introduced from the air hole at all times, whereby it is possible for the suction operation of the vacuum pump to be continuously carried out without being intermittently interrupted. Accordingly, notching chips are smoothly sucked and discharged without being caught in any part of the notcher and, therefore, the notcher involves no risk of trouble occurring.

Further, since notching chips are collected in the notching chip collecting box through the hose and the bores, there is no need to provide a guide mechanism for regulating the behavior of the notching chips. Moreover, all the notching chips are reliably collected in the notching chip collecting box. There is therefore no possibility of notching chips scattering around the notcher, which would give rise to problems of some kind.

Furthermore, since the notcher is continuously used at high speed, the notch forming speed has heretofore been limited owing to the thermal expansion of the notching cutter. In the notcher according to this embodiment, however, air of ordinary temperature constantly flows through the inside of the notching cutter. The notching cutter is therefore effectively cooled, so that it is possible to increase the notch forming speed and to improve the durability of the notcher.

Figure 5:
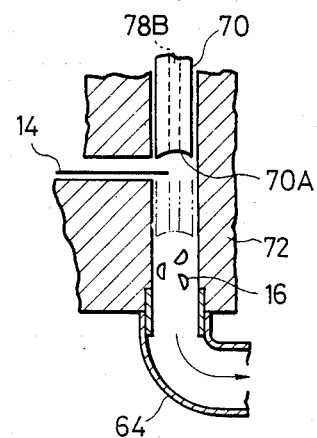
FIG. 5 shows an essential portion of a second embodiment of the according to the present invention.
Figure 6:
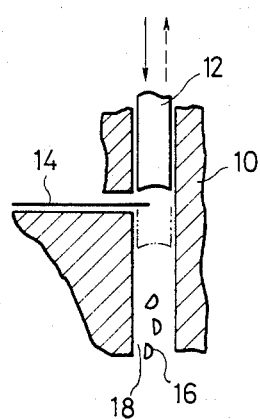
FIGS. 6 and 7 show respective essential portions of conventional notchers.
Figure 7:
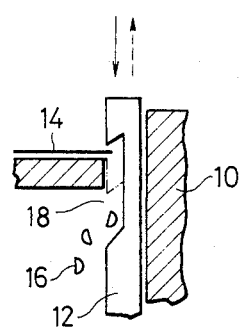

Referring next to FIG. 5, there is shown an essential portion of a second embodiment of the notcher according to the present invention. The second embodiment exemplifies a force-cut type notcher in which the lower end portion of a notching cutter 70 is formed into a notch cutting edge 70A, while the upper end portion of the notching cutter 70 is connected to a driving means (not shown) in such a manner that the notching cutter 70 is movable downwardly. The notching cutter 70 is formed with an air hole 78B which opens onto the lower end surface of the cutter 70. The upper side of the air hole 78B opens to the atmospheric air. On the other hand, a die 72 has a die bore connected at its lower end with the hose 64 which is in turn connected to the vacuum pump and the notching chip collecting box (which are not shown).

The notcher according to this embodiment operates in a manner similar to that of the notcher according to the first embodiment except that the notching cutter 70 is pushed down from the upper side thereof and that notching chips 16 are sucked and discharged from the lower side of the die bore of the die 72. The second embodiment offers the same effect as that offered by the first embodiment.

As has been described above, in the notcher according to the present invention, the air hole is formed in the notching cutter, and air stream is thereby formed in the notching chip discharge path at all times. It is therefore advantageously possible for notching chips to be smoothly discharged.

What is claimed is:

1. A notcher which comprises:
  (a) a die having a die bore connected to a suction device; and
  (b) a notching cutter movable between first and second positions, said nothching cutter performing a cutting operation between said first and second positions, and said nothcing cutter having an air hole for communicating ambient air with said die bore when said notching cutter is in said second position.

2. A notcher according to claim 1, further comprising a conveyor table which supports said die and has a guide groove by which an object to be notched is guided to a notching position.

3. A notcher according to claim 2, further comprising means for driving said notching cutter between said first and second positions.

4. A notcher according to claim 3, wherein said driving means includes a solenoid and a rod which is connected to one axial end of said notching cutter such that, when said solenoid is excited, said rod is axially moved by a predetermined stroke.

5. A notcher according to claim 4, further comprising means for preventing said notching cutter from rotating around its own axis.

6. A notcher according to claim 5, wherein said rotation preventing means is constituted by a planar cut portion formed in a portion of said notching cutter in parallel to the moving direction of said notching cutter, and a plate-like member which abuts against said cut portion, whereby said notching cutter is prevented from rotating around its own axis.

7. A notcher according to claim 6, further comprising means for counting the number of notches, said counting means being constituted by a sensor and a light-intercepting plate, said sensor including a light projector and a light receiver which are respectively disposed on opposing surfaces of said sensor, and said light-intercepting plate being connected to said rod and moved together with said rod such as to intercept the beam emitted from said light projector to said light receiver when said plate is located between said light projector and said light receiver, whereby the number of times of reception of the beam by said light receiver is detected.

8. A notcher according to claim 7, wherein said suction device is a vacuum pump, and said die bore is communicated with a horizontal bore formed in said die, said horizontal bore being connected to said vacuum pump through a hose and a notching chip collecting box.

9. A notcher according to claim 8, wherein said notching cutter is of a draw-cut type.

10. A notcher according to claim 8, wherein said notching cutter is of a force-cut type.

11. A notcher for forming a notch on a photographic film or the like which comprises:
   (a) a cylindrical die having a die bore connected to a suction device;
   (b) a cylindrical notching cutter movable between and second positions, said notching cutter performing a cutting operation between said first and second positions, and said notching cutter being formed with an air hold which is communicated with said die bore when said notching cutter is in said second position;
   (c) a conveyor table supporting said die and having a guide groove by which said film or the like is guided to a notching position; and
   (d) means for driving said notching cutter between said first and second positions.

12. A notcher according to claim 11, wherein said notching cutter has at one of its endd a notching edge portion which forms a notch on said film or the like and at the other end an engagement portion connected to said driving means.

13. A notcher according to claim 12, wherein said driving means includes a solenoid and a rod which has one end thereof pivotally connected to the engagement portion of said notching cutter such that, when said solenoid is excited, said rod is moved by a predetermined stroke in the direction in which a notch is formed on said film or the like.

14. A notcher according to claim 13, wherein said notching cutter has an enlarged-diameter portion through which said notching cutter is constantly biased by biasing means in the opposite direction relative to the notch forming direction.

15. A notcher according to claim 14, further comprising means for preventing said notching cutter from rotating around its own axis, said rotation preventing means being constituted by a planar cut portion extending in parallel to the moving direction of said notching cutter, and a plate-like member of a plastic which is disposed such as to abut against said cut portion, whereby said notching cutter is prevente,d from rotating around its own axis.

16. A notcher according to claim 15, further comprising means for counting the number of notches, said counting means being constituted by a sensor and a light-intercepting plate, said sensor including a light projector and a light receiver which are respectively disposed on opposing surfaces of said sensor, and said light-intercepting plate being connected to said rod and moved together with said rod such as to intercept the beam emitted from said light projector to said light receiver when said plate is located between said light projector and said light receiver, whereby the number of times of reception of the beam by said light receiver is detected and the number of notches is thereby counted.

17. A notcher according to claim 16, wherein said suction device is a vacuum pump, and said die bore is communicated with a horizontal bore formed in said die, said horizontal bore being connected to said vacuum pump through a hose and a notching chip collecting box.

18. A notcher according to claim 17, wherein said notching cutter is of a draw-cut type in which said notching edge portion has a substantially semicylindrical cut portion, and said air hole extends from said cut portion to one end surface of said notching edge portion.

19. A notcher according to claim 17, wherein said notching cutter is of a force-cut type in which said notching edge portion has a notch cutting edge formed at one end surface thereof, and said air hole extends to the center of said one end surface.

20. A notcher of a drawn-type for forming a notch on a photographic film or the like which comprises:
   a cylindrical die having a die bore connected to a suction device; and
   a cylindrical nothcing cutter movable between first and secdnd positions, said notching cutter having a cutting edge constituted such that a cutting operation is performed between said first and second positions when said nothching cutter is drawn, and said nothcing cutter being formed with an air hole communicating a portion of the nothcing edge with ambient air, the air being communicated with said die bore when said notching cutter is in said second position.
   whereby a notching chip is smoothly suched into sAid suction device and simultaneously therewith said nothcing cutter is effectively cooled from the inside of said notching cutter through said air hole.

* * * * *